US012754981B2

(12) United States Patent
Dogra et al.

(10) Patent No.: US 12,754,981 B2
(45) Date of Patent: Oct. 6, 2026

(54) SYSTEM AND METHOD FOR POLICY ENFORCEMENT

(71) Applicant: Google LLC, Mountain View, CA (US)

(72) Inventors: Tushar Dogra, Livermore, CA (US); Wei Qiao, Santa Clara, CA (US); Yu-Han Lyu, San Ramon, CA (US); Dongjin Kwon, Sunnyvale, CA (US); Tiantian Fang, Santa Clara, CA (US); Arjun Gopalan, San Jose, CA (US); Yuan Wang, Los Altos, CA (US); Vincent Zanotti, Mountain View, CA (US); Otilia Stretcu, Fremont, CA (US); Chun-Ta Lu, Sunnyvale, CA (US); Ariel Fuxman, Redwood City, CA (US); Mehmet Nejat Tek, Redwood City, CA (US); Thomas Nathan Denby, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 228 days.

(21) Appl. No.: 18/561,379

(22) PCT Filed: Sep. 14, 2023

(86) PCT No.: PCT/US2023/032706
§ 371 (c)(1),
(2) Date: Nov. 16, 2023

(87) PCT Pub. No.: WO2025/058627
PCT Pub. Date: Mar. 20, 2025

(65) Prior Publication Data
US 2025/0225213 A1 Jul. 10, 2025

(51) Int. Cl.
*G06F 21/16* (2013.01)
*G06F 16/583* (2019.01)
*G06F 21/10* (2013.01)

(52) U.S. Cl.
CPC .......... *G06F 21/16* (2013.01); *G06F 21/1066* (2023.08); *G06F 16/583* (2019.01)

(58) Field of Classification Search
CPC .... G06F 21/16; G06F 21/1066; G06F 16/583; G06F 16/951; G06F 16/958; G06F 16/906
See application file for complete search history.

(56) References Cited

U.S. PATENT DOCUMENTS 9,009,834 B1 4/2015 Ren et al.
10,637,826 B1 * 4/2020 Luo .................... H04L 63/0245 707/737

(Continued)

OTHER PUBLICATIONS

International Search Report and Written Opinion for PCT Application No. PCT/US2023/032706, dated Feb. 15, 2024. 14 pages.

*Primary Examiner* — Yuk Ting Choi
(74) *Attorney, Agent, or Firm* — Lerner David LLP

(57) ABSTRACT

The technology is generally directed to determining whether candidate digital components violate a policy and using the determination to propagate policy labels. Candidate digital components may be filtered such that only a subset of the candidate digital components is provided to a machine learning model for further policy review. The machine learning model may provide a confidence score associated with the policy violation prediction. The policy violation prediction may be "violates policy" or "does not violate policy." A label corresponding to the policy violation prediction may be associated with the digital component. The confidence score may be used when determining whether to use the policy violation prediction to propagate labels to other digital components. The labels may be propagated using a seed based enforcement system or a neighborhood based propagation system.

20 Claims, 11 Drawing Sheets

(56) References Cited

U.S. PATENT DOCUMENTS

| | | | | | |
|---|---|---|---|---|---|
| 10,803,013 | B2 | 10/2020 | Burns et al. | | |
| 11,023,823 | B2 | 6/2021 | Strauss | | |
| 11,574,145 | B2 | 2/2023 | Narlikar et al. | | |
| 11,669,860 | B2 * | 6/2023 | Scott-Green | G10L 15/22 | 705/14.47 |
| 2005/0060643 | A1 | 3/2005 | Glass et al. | | |
| 2007/0133034 | A1 | 6/2007 | Jindal et al. | | |
| 2009/0245573 | A1 * | 10/2009 | Saptharishi | H04N 23/63 | 382/103 |
| 2020/0336509 | A1 * | 10/2020 | Wang | H04L 67/306 | 382/159 |
| 2021/0406601 | A1 * | 12/2021 | Narlikar | G06F 18/213 | 705/14.47 |
| 2022/0116402 | A1 | 4/2022 | Chai et al. | | |
| 2023/0169759 | A1 * | 6/2023 | Kandpal | G06V 10/774 | 382/159 |
| 2024/0256584 | A1 * | 8/2024 | Wang | G06F 16/3334 | 705/14.47 |
| 2024/0256840 | A1 * | 8/2024 | Song | G06N 3/045 | 705/14.47 |

* cited by examiner

900

SYSTEM AND METHOD FOR POLICY ENFORCEMENT

CROSS-REFERENCE TO RELATED APPLICATIONS

The present application is a national phase entry under 35 U.S.C. § 371 of International Application No. PCT/US2023/032706 filed Sep. 14, 2023, which is hereby incorporated herein by reference.

BACKGROUND

Typically, when determining policy violations, a user manually reviews each digital component to determine whether the digital component does or does not violate the policy of a given publisher. Automatic classification systems can flag a digital component for further review but will still provide the digital component for output by a publisher while the digital component is pending review by the user. This can result in policy violating digital components being provided for output. User reviews of each digital component is time consuming and intensive. Moreover, attempting to replace user reviewers with an automatic classification system that reviews all digital components is computationally expensive, requiring a large amount of processing power, memory, and network overhead.

BRIEF SUMMARY

The technology is generally directed to determining whether candidate digital components violate a policy and using the determination to propagate policy labels. Candidate digital components may be filtered such that only a subset of the candidate digital components is provided to a machine learning model. The machine learning model may be a large language model ("LLM") for further policy review. The candidate digital components may be filtered based on content and/or content provider similarity to previously reviewed digital components, whether the candidate digital component already includes a policy violation label, etc. The subset of the candidate digital components remaining after the filtering may be provided as input to the LLM. The LLM may provide a confidence score associated with the policy violation prediction. The policy violation prediction may be "violates policy" or "does not violate policy." Based on the policy violation prediction, a label corresponding to the prediction may be associated with the digital component. According to some examples, the confidence score may be used when determining whether to use the policy violation prediction to propagate labels to other digital components. For example, when the confidence score is above a threshold, the LLM labeled digital component may be used to propagate the policy label to other similar digital components. The labels may be propagated using a seed based enforcement system or a neighborhood based propagation system. The seed based propagation system may propagate labels based on similarity of content and/or content providers. The neighborhood based propagation system may use a machine learning ("ML") model to predict a confidence score that is then used to propagate labels to neighboring digital components.

One aspect of the disclosure is directed to a method, comprising determining, by one or more processors, embeddings associated with a plurality of candidate digital components and previously reviewed digital components, determining, by one or more processors based on the determined embeddings, a similarity between the candidate digital components and previously reviewed digital components, the similarity comprising at least one of a content similarity or a content provider similarity, identifying, by the one or more processors, a subset of digital components from the plurality of candidate digital components, wherein the subset of digital components includes one or more digital components having the similarity below a threshold similarity, providing, by the one or more processors, the identified subset of digital components as input to a machine learning model, determining, by the one or more processors executing the machine learning model, that digital components of the subset of digital components violate a policy, labeling, by the one or more processors based on the determined policy violation, the subset of digital components, and propagating, by the one or more processors, labels to other digital components, wherein the other digital components are outside of the subset of digital components.

The method may further comprise removing, by the one or more processors from the plurality of candidate digital components, a second subset of digital components from the plurality of candidate digital components, wherein the second subset of digital components includes one or more digital components having the similarity above the threshold similarity. The method may further comprise identifying, by the one or more processors, the previously reviewed digital component having a greater similarity to the second subject of digital components and labeling the second subset of digital components with a policy violation label of the previously reviewed digital component having the greater similarity.

The previously reviewed digital components may comprise at least one of a previously reviewed labeled digital component or a previously reviewed unlabeled digital component. When identifying the one or more digital components, the method may further comprise removing, from the plurality of candidate digital components, the previously reviewed labeled digital component.

The method may further comprise determining, by the one or more processors, whether the machine learning model has determined a policy violation for a candidate digital component; and deduplicating the plurality of candidate digital components to remove the candidate digital component having a previously determined policy violation.

When determining that the one or more digital components violates the policy, the method may further comprise determining, by the one or more processors executing the machine learning model, a binary response to at least one prompt. The binary response may be a yes or a no. The at least one prompt may be generated based on the policy.

When propagating the labels to the other digital components, the method may further comprise identifying, by the one or more processors based on the determined embeddings, neighboring digital components; and labeling, by the one or more processors, neighboring digital components with a policy label corresponding to a policy label of the subset of digital components. The neighboring digital components may include unlabeled digital components within a threshold embedding distance of one or more of the subset of digital components.

The other digital components may include at least one of a previously reviewed labeled digital component, a previously reviewed unlabeled digital component, or an unlabeled digital component.

The machine learning model may be a large language model ("LLM").

Another aspect of the disclosure is directed to a system comprising one or more processors. The one or more processors may be configured to determine embeddings associated with a plurality of candidate digital components and previously reviewed digital components, determine, based on the determined embeddings, a similarity between the candidate digital components and previously reviewed digital components, the similarity comprising at least one of a content similarity or a content provider similarity, identify a subset of digital components from the plurality of candidate digital components, wherein the subset of digital components includes one or more digital components having the similarity below a threshold similarity, provide the subset of digital components as input to a machine learning model, determine, by executing the machine learning model, that digital components of the subset of components violate a policy, label, based on the determined policy violation, the subset of digital components, and propagate labels to other digital components, wherein the other digital components are outside of the subset of digital components.

Yet another aspect of the disclosure is directed to one or more computer-readable medium storing instructions, which when executed by one or more processors, cause the one or more processors to determine embeddings associated with a plurality of candidate digital components and previously reviewed digital components, determine, based on the determined embeddings, a similarity between the candidate digital components and previously reviewed digital components, the similarity comprising at least one of a content similarity or a content provider similarity, identify a subset of digital components from the plurality of candidate digital components, wherein the subset of digital components includes one or more digital components having the similarity below a threshold similarity, provide the subset of digital components as input to a machine learning model, determine, by executing the machine learning model, that digital components of the subset of components violate a policy, label, based on the determined policy violation, the subset of digital components, and propagate labels to other digital components, wherein the other digital components are outside of the subset of digital components.

DETAILED DESCRIPTION

Figure 1:
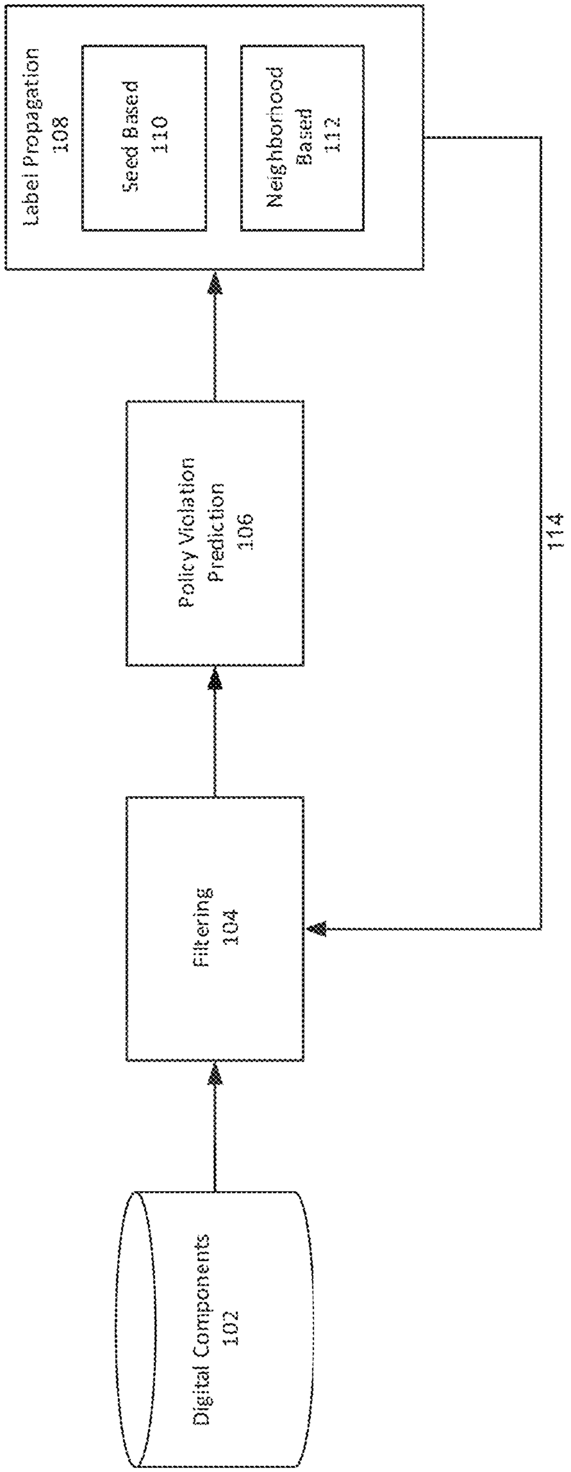
FIG. 1 is a flow diagram for determining and propagating policy violations in accordance with aspects of the disclosure.

The technology is generally directed to determining whether candidate digital components violate a policy based on how similar the content or content provider is to previously identified policy violating digital components. The digital component may be, for example, static and/or animated images, text, video, or the like. The content, or content type, may be something visually or audibly identifiable within the digital component. The content provider may be, for example, the person, entity, or the like that provided the digital component as part of a content submission to a publisher. The publisher may be, for example, a website or mobile application that provides the digital component for output. Digital components that have been previously identified as policy violating may include one or more policy labels indicating that the digital component violates a policy, what the violation is, or the like.

The policy labels and associated digital components, including the content and content provider, may be used to train a machine learning ("ML") model to predict whether newly submitted digital components violate the policy. For example, the ML model may compare embeddings associated with the content and/or content provider of the candidate digital component with embeddings associated with the content and/or content provider of the previously labeled digital component. The machine learning model may provide an indication prediction of a policy violation based on how similar the content or content provider is.

The candidate digital components may be filtered based on the policy violation prediction, content similarity, and/or content provider similarity. For example, if a predicted probability of a policy violation is below a threshold, the candidate digital component may be filtered from further review. If the content and/or content provider similarity is above a similarity threshold, the candidate digital component may be filtered from further review. If the content and/or content provider similarity is below the similarity threshold, the candidate digital component may be flagged for further review. The candidate digital components flagged for further review may be provided as input into a machine learning model.

Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some machine-learned models can include multi-headed self-attention models (e.g., transformer models).

The model(s) can be trained using various training or learning techniques. The training can implement supervised learning, unsupervised learning, reinforcement learning, etc. The training can use techniques such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions.

Gradient descent techniques can be used to iteratively update the parameters over a number of training iterations. A number of generalization techniques (e.g., weight decays, dropouts) can be used to improve the generalization capability of the models being trained.

The model(s) can be pre-trained before domain-specific alignment. For instance, a model can be pre-trained over a general corpus of training data and fine-tuned on a more targeted corpus of training data. A model can be aligned using prompts that are designed to elicit domain-specific outputs. Prompts can be designed to include learned prompt values (e.g., soft prompts). The trained model(s) may be validated prior to their use using input data other than the training data, and may be further updated or refined during their use based on additional feedback/inputs.

The machine learning model may be, for example, a large language model ("LLM"). The LLM may determine whether the candidate digital component violates the policy. Based on the LLM's determination, the candidate digital component may be labeled. The label associated with the candidate digital component may be used to propagate labels to other digital components.

According to some examples, determining the similarity of digital components to propagate labels before further review of the digital components may increase computational efficiency. For example, if the content and/or content provider of a candidate digital component is above a threshold similarity of a previously labeled digital component, further review of the digital component is not required. Rather, the label from the previously labeled digital component may be automatically applied to the candidate digital component. By automatically applying labels to digital components that are above a threshold similarity to previously labeled digital components, processing power and network overhead may be reduced by no longer having to review all candidate digital components.

Policy label determinations and propagation of labels may prevent unwanted digital components from being provided for output to a user. For example, by propagating policy violation labels to digital components having similar content and/or content providers, policy violating digital components are prevented from being provided for output to a user without ever having been reviewed. This increases computational efficiency by negating the requirement for all digital components to be reviewed, thereby decreasing the processing power and network overhead. Further, processing power and network overhead is decreased as providing a replacement digital component for a policy violating digital component would not be necessary due to the policy labels.

FIG. 1 is an example flow diagram illustrating a method for predicting whether a digital component violates a policy and the propagation of the determination. Predicting a policy violation may include identifying candidate digital components 102, filtering the candidate digital components 104, predicting a policy violation 106, propagating the label 108 associated with the predicted policy violation, and a feedback loop 114.

Digital Components

The candidate digital components 102 may be digital components that have been received by a publisher. A publisher may provide content, such as digital components, for output on a website or mobile application. The digital components may, in some examples, be static or animated images, videos, advertisements, or the like. The digital components 102 may be stored in a storage device for review regarding policy violations. For example, the candidate digital components 102 may be reviewed to predict a policy violation before being provided for output.

Figure 2:
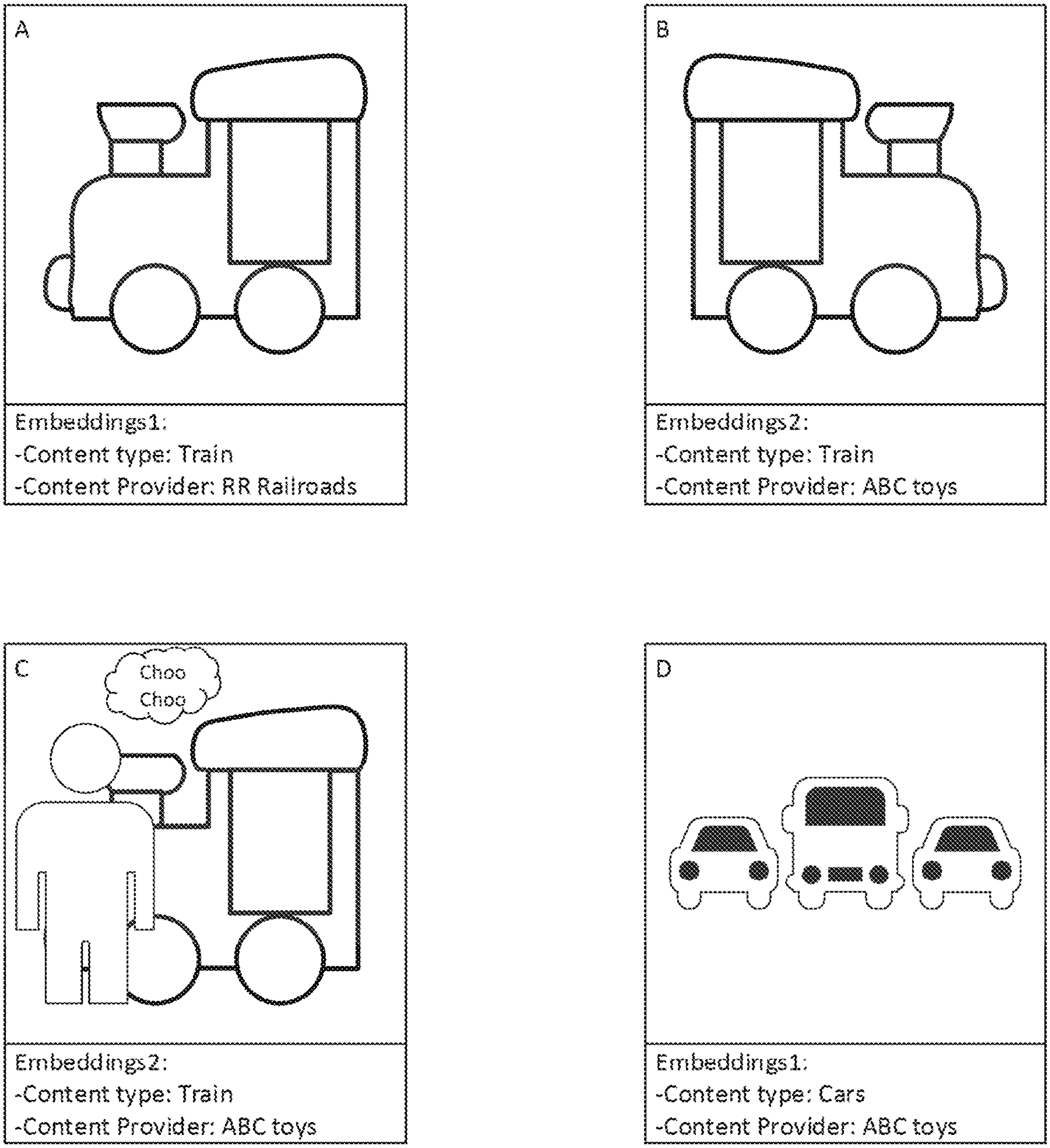
FIG. 2 is a pictorial diagram of example digital components in accordance with aspects of the disclosure.

FIG. 2 illustrates example candidate digital components. The candidate digital components A-D may be associated with information, such as embeddings. The embeddings may correspond to a content type, content provider, or the like. In some examples, a comparison of the embeddings of the digital components may provide an indication of how similar or different content of digital components are, how similar or different content providers are, or the like.

According to some examples, the embeddings may be generated using a ML model. For example, the embedding may be a representation of the content type and/or content provider of a given digital component, the representation generated by the ML model. According to some examples, the embeddings may be stored in a database, memory, storage system, or the like that can be accessed by the system. For example, the ML model may access the database to use the embeddings as training data and/or inference data to determine a probability of a policy violation.

The content type may be, for example, the type of content within the digital component. In some examples, the content type may be what is visible in the digital component. As shown, the content type for candidate digital component A is "train" as a train is visible in the candidate digital component. In contrast, the content type for candidate digital component C may be "train; person; text" as a train, a person, and a text bubble are visible within the candidate digital component C. Each content type, e.g., train, person, text, car, etc., may correspond to an embedding value.

The content provider may be, for example, the provider who submitted the candidate digital component to the publisher. According to some examples, the content provider may be a person, entity, business, etc. associated with the digital component. Each content provider may correspond to an embedding value.

Filtering

Returning to FIG. 1, the candidate digital components 102 may be filtered 104. According to some examples, the candidate digital components 102 may be filtered 104 based on content and/or content provider similarity. The content and/or content provider similarity may be determined based on a comparison of the embeddings of a candidate digital component to previously labeled digital components, previously reviewed unlabeled digital components, or the like (collectively "previously labeled digital components").

According to some examples, previously labeled digital components may be digital components which have been reviewed for a policy violation and have been labeled with a label of "violates policy" or "no policy violation." The embeddings associated with the previously labeled digital components may be compared with the embeddings of the candidate digital components. For example, a distance between the content and/or content provider embedding of a candidate digital component and the previously labeled digital components may be determined. If the distance is within a threshold distance, the candidate digital component may be identified as similar to the respective previously labeled digital component. In contrast, if the distance is greater than the threshold distance, the candidate digital component may be identified as dissimilar from the previously labeled digital components. In such an example, the candidate digital component may be identified as needing further review.

According to some examples, the embedding distances between the candidate digital component and the previously labeled digital components may correspond to a similarity score. For example, the smaller the distance between the embeddings, the greater the similarity score, and, therefore, the more similar the candidate digital component and previously labeled digital component may be. Candidate digital components with a similarity score below a threshold may be selected for further review. Candidate digital components with a similarity score above a threshold may be filtered out from further review. In some examples, the candidate digital components with a similarity score above a threshold may be automatically labeled with the policy label of the similar previously labeled digital component. The automatic labeling of candidate digital components is discussed more, herein, with respect to label propagation techniques.

In some examples, candidate digital components 102 may be compared to digital components that have already been reviewed by the LLM but have not been labeled with a policy violation label. For example, if a digital component has been reviewed by the LLM but the confidence score of the LLM indicates that there is likely no policy violation, the digital component may remain unlabeled and be returned to the filtering stage 104. This unlabeled already reviewed digital component may, therefore, be a non-policy violating digital component. The candidate digital components 102 may be compared to the unlabeled already reviewed digital components. If the candidate digital components 102 are above a threshold similarity to the unlabeled already reviewed digital components, the candidate digital components 102 may be filtered from further review. In particular, if the candidate digital component 102 is above a threshold similarity to the unlabeled already reviewed digital component, is it likely the LLM is going to determine a similar confidence score for the candidate digital component as the confidence score for the unlabeled already reviewed digital component. Therefore, rather than utilizing computational resources for further review, the candidate digital component 102 may be filtered out based on the similarity to the unlabeled already reviewed digital component. In such an example, the candidate digital component is likely to be a non-policy violating digital component based on its similarity to the unlabeled already reviewed digital component which was determined to be a non-policy violating digital component.

According to some examples, only some of the candidate digital components 102 may be provided to the LLM to determine whether the digital component violates a policy. For example, candidate digital components above a threshold similarity score may be filtered from further policy review by the LLM. Additionally or alternatively, candidate digital components that have already been reviewed and/or already been labeled may be filtered from further policy review by the LLM. For example, digital components that have already been labeled with a policy label may be excluded from further, or additional, policy review. According to some examples, a ML model may be used to predict a probability of a policy violation. In such an example, if the probability of a policy violation for a given candidate digital component is below a threshold, the candidate digital component may be filtered out from further policy review.

By funneling, or filtering 104, the digital components, only a subset of candidate unlabeled digital components may have to be further analyzed for policy violations. This may increase computational efficiency by decreasing processing power and network overhead. For example, by analyzing only a subset of candidate digital components, as compared to analyzing all the candidate digital components, and using the policy determination to propagate labels to other digital components with similar content and/or content providers, the number of candidate digital components to be analyzed is decreased thereby decreasing the amount of processing power and network overhead by way of certain candidate components not needing to be provided to the LLM to determine whether the digital component violates a policy.

Figure 3:
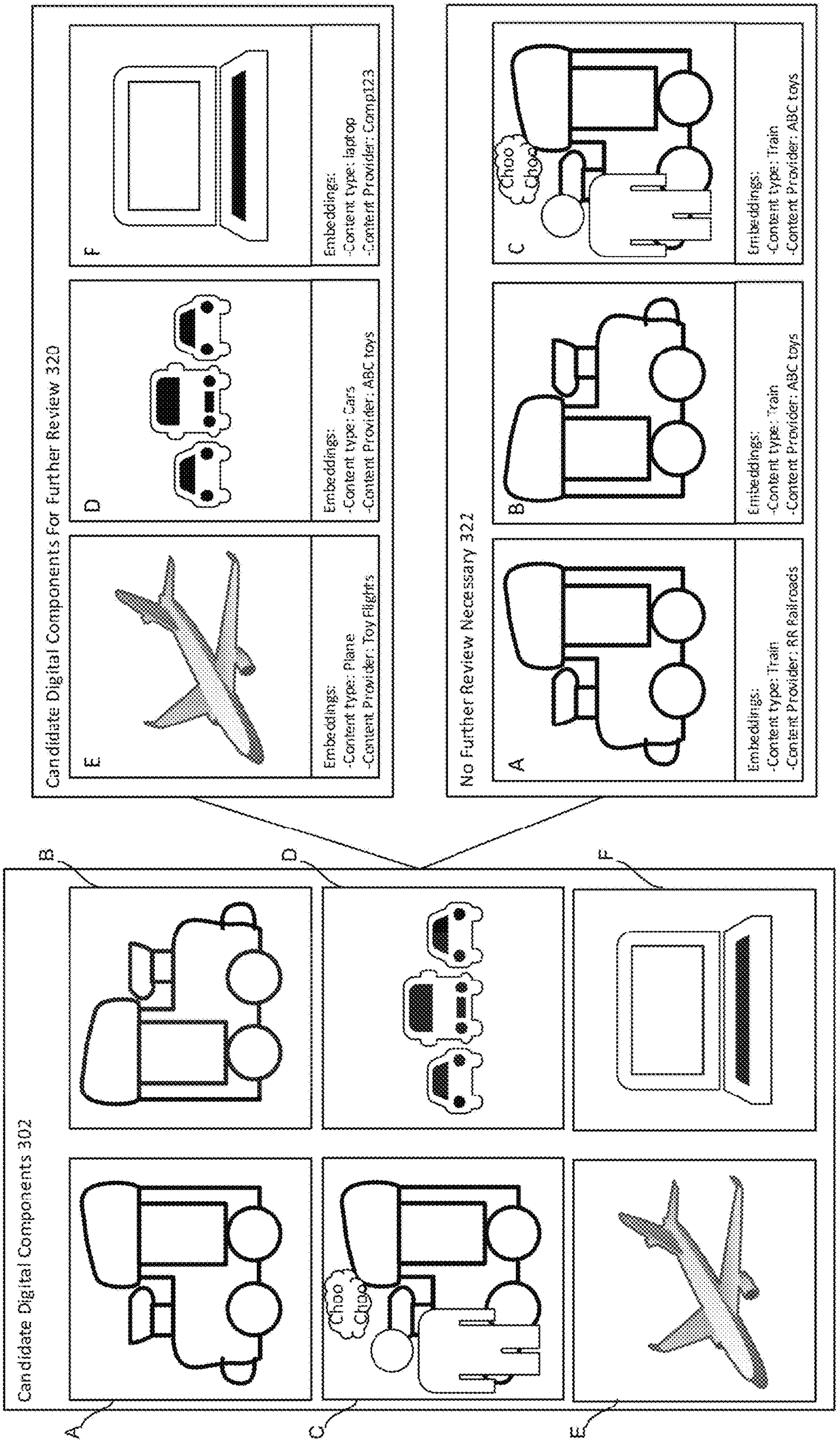
FIG. 3 is a block diagram of filtering example digital components in accordance with aspects of the disclosure.

FIG. 3 illustrates an example of filtering of candidate digital components based on content and/or content provider similarity. Each candidate digital component 302 may be associated with corresponding embedding values for their content type and content provider. The embeddings may be used to filter, or funnel, the candidate digital components into those that will be further reviewed 320 and those where no further review is necessary 322.

The candidate digital components A-F may be compared to previously labeled digital components. For example, the embeddings associated with candidate digital components A-C may be within a threshold distance from the embeddings associated with previously labeled digital components. In such an example, the content type, e.g., trains, of the candidate digital components A-C may be substantially similar to the content type of previously labeled digital components. Additionally or alternatively, the content provider, e.g., ABC toys and/or RR Railroads, may be substantially similar to the content provider of previously labeled digital components. In examples where the distance between embeddings is less than a threshold distance or the similarity score is above a threshold similarity score, the candidate digital components, e.g., candidate digital components A-C, may be filtered out from additional policy review 322.

Based on the embedding distance of either or both the content type and content provider being within a threshold to the previously labeled digital components, the candidate digital components A-C may be automatically labeled with the policy label associated with the similar previously labeled digital components. In some examples, when the similarity of the content type and/or content provider of the candidate digital components A-C to the previously labeled digital components is above a threshold similarity, the candidate digital components A-C may be automatically labeled with the policy label associated with the similar previously labeled digital components. The automatic labeling of candidate digital components is discussed in greater, herein, in association with label propagation 108.

According to some examples, the embeddings associated with the content type and/or content provider of candidate digital components D-F may be at a distance greater than the threshold distance from the embeddings associated with the content type and/or content provider the previously labeled digital components. In such an example, the content type and/or content provider of the candidate digital components D-F may have a similarity score to the previously labeled digital components below a threshold similarity score. In examples where the distance between embeddings is greater than a threshold distance or the similarity score is below a threshold similarity score, the candidate digital components, e.g., candidate digital components D-F, may be flagged for additional policy review 320.

Filtering the candidate digital components may increase computational efficiency by reducing the volume of digital components for additional policy review. For example, by removing candidate digital components for further review based on similarity to previously labeled and/or previously reviewed unlabeled digital components, the remaining digital components may be representative, highly impressed potential positive under-flagged digital components. By only providing a subset of candidate digital components for further review, computational efficiency is increased by reducing the amount of processing power required to further review the digital components. For example, processing power and network overhead is decreased, and the number of digital components is decreased through the filtering stage.

Policy Violation Prediction

Referring back to FIG. 1, after filtering 104 the candidate digital components, the remaining candidate digital components may be provided as input to the LLM for a policy violation prediction 106. For example, after being filtered, only a subset of the candidate digital components may be provided as input into the LLM for additional policy review.

The LLM may be used to classify the digital components as policy violating or not. In some examples, the LLM may be configured to provide a confidence score associated with the policy violating determination. The policy violating determination may be "violates policy" or "does not violate policy." The LLM model utilizes one or more prompts to determine whether a given digital component violates a policy. The prompts may be generated based on what is considered violating content for a given policy. The prompts may be binary such that the answer to the prompt is one answer or another. For example, the binary answer may be yes or no, 1 or 0, or the like. In some examples, the prompts may be non-binary, such that more than two answers may be possible. In such an example, the response to a non-binary prompt may be converted into a binary answer. The conversion may be dependent upon the prompt, the number of possible answers, or the like.

The LLM responses to the prompts may be used to generate a confidence score regarding whether the digital component violates the policy. According to some examples, the answers to the prompts may have a log probability that indicates the accuracy of the answer provided by the LLM to a given prompt. The probabilities may, in some examples, be used to generate the confidence score. In some examples, the probabilities may correspond to the confidence score.

If the confidence score is above a threshold, the policy label associated with the digital component may be used to propagate the label to similar digital components, e.g., digital components having a similarity score above a threshold. If the confidence score is below the threshold, the label may be associated with the digital component may not be used to propagate the label to other digital components.

Figure 4:
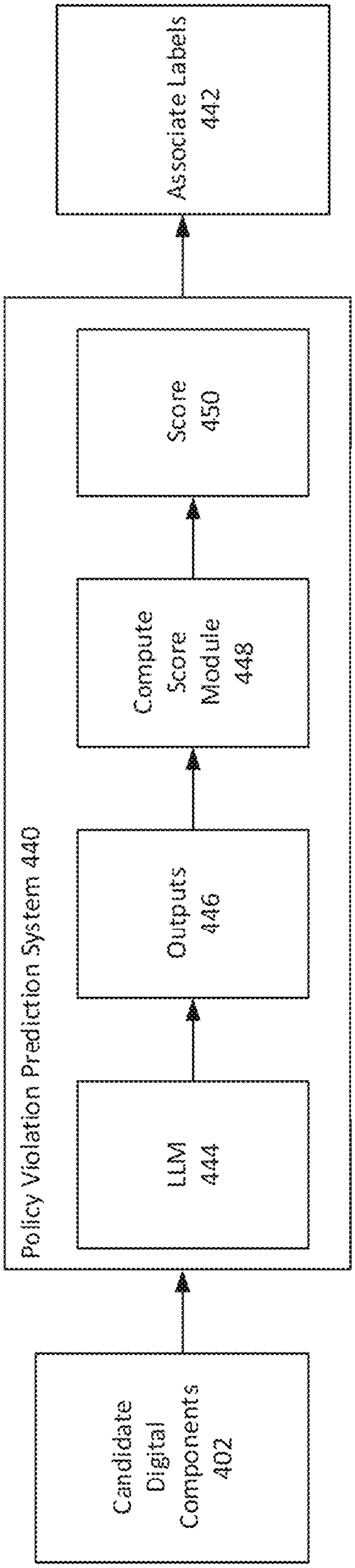
FIG. 4 is a flow diagram of an example method for determining policy violations in accordance with aspects of the disclosure.

FIG. 4 illustrates a block diagram of a policy violation prediction system, which can be implemented on one or more computing devices in one or more locations. The policy violation prediction system 440 may be part of a remote system in communication with one or more user devices via a network. The remote system may be a single computer, multiple computers, or a distributed system like a cloud environment. The remote system may include computing resources, such as data processing hardware, and storage resources, such as memory hardware. A data store, such as a remote storage device, may be overlain on the storage resources to allow scalable use of the storage resources by one or more of the clients, such as the user devices, or the computing resources. The data store can be configured to store a plurality of data blocks within one or more tables, such as a cloud database, that each include a plurality of rows and columns. The data store may store any number of tables.

The policy violation prediction system 440 may be configured to receive a candidate digital component 402 as input. The candidate digital components 402 may be static or animated images, videos, text, etc., received from a content provider. Each candidate digital component 402 received as input can request one or more tasks for the policy violation prediction system 440 to generate a confidence score regarding a policy violation. The confidence score may indicate the likelihood as to whether the candidate digital component 402 provided as input violates a policy. The policy violation prediction system 440 may be configured to label 442 the candidate digital component 402 with a label based on the confidence score. For example, if the confidence score is above a threshold, a label 442 indicating a policy violation may be associated with the candidate digital component 402.

The policy prediction violation system 440 may include a machine learning model, such as an LLM 444. The LLM 444 may be configured to provide a plurality of outputs 446. The policy violation system 440 may include a score compute module 448 configured to receive the plurality of outputs 446 and provide, as output, a plurality of scores 450. The LLM 444 may receive the candidate digital components 402 as input. The outputs 446 of LLM 444 can include answers to prompts used by the LLM 444 to determine whether a given candidate digital component 402 violates a policy. The prompts may be generated based on a given policy for a publisher. The prompts may be binary prompts, requiring a yes or no answer, a "0" or "1," or any other binary response.

The outputs 446 may be binary responses to the prompts of the LLM 444. The outputs 446 may have a probability that indicates accuracy of the answer provided by the LLM 444 to a given prompt. The probability may be, for example, a log probability.

The outputs 446 may be provided as input into a compute score module 448. The compute score module 448 may be configured to determine a confidence score 450 associated with the policy violating determination of the LLM 444. For example, the compute score module 448 may provide an initial score. The score may be a log probability between negative infinity and zero. The compute score module 447 may, for a "yes" answer to the prompt, determine: exp (log probability). In some examples, for a "no" answer to the prompt, the compute score module 448 may determine: 1-exp(log probability). The determination may convert the log probability to a score at or between zero and one. The score between zero and one may be the score 450. In some examples, the probabilities, e.g., the score between zero and one, may correspond to the confidence score 450.

According to some examples, the compute score module 448 may provide a score at or between zero and one. In such an example, the log probability of the score may not need to be determined. Rather, the score at or between zero and one may be provided as score 450.

The confidence score 450 may be used to associate a label 442 with the given candidate digital component 402. For example, if the confidence score 450 is above a threshold, a policy label may be associated with the digital component and used to propagate the label to similar digital components. In contrast, if the confidence score 450 is below the threshold, a policy label may be associated with the digital component but not used to propagate the label to other digital components. According to some examples, the threshold may be set based on the policy.

According to some examples, the confidence score 450 may be used to determine whether the candidate digital component and associated label can be used to propagate labels to other incoming candidate digital components. For example, if the confidence score 450 is above a threshold, the digital component and its associated label may be used to propagate the policy label to other digital components. The policy label may be propagated to other digital components when the similarity between the given candidate digital component and the other digital component is above a threshold similarity. In contrast, if the confidence score 450 is below the threshold, the digital component and its associated label may not be used to propagate the policy label to other digital components.

The policy label may correspond to the policy violation prediction of the LLM 444. For example, if the policy violation prediction is "violates policy" or "does not violate policy" and the confidence score 450 is above the threshold, a "violates policy" or "does not violate policy" label, respectively, may be associated with the digital component and used to propagate the label to similar digital components. Alternatively, if the policy violation prediction is "violates policy" or "does not violate policy" and the confidence score 450 is below a threshold, the "violates policy" or "does not violate policy" label, respectively, may be associated with the digital component but not used to propagate the associated policy label.

The policy violation prediction system 440 may increase the computational efficiency of reviewing candidate digital components by determining high quality and/or highly accurate policy labels for the digital components. The policy labels determined by the policy violation prediction system may then be used to propagate policy labels to similar digital components. By determining a policy violation prediction with high accuracy, e.g., high confidence scores, and applying the appropriate policy label based on the confidence score, computational efficiency may increase by reducing the number of times a given digital component has to be reviewed for policy violations. For example, by only having to review the digital component once for a policy violation, processing power and network overhead is decreased as additional reviews are not required. Further, by only reviewing the digital component once and using the high quality and/or highly accurate policy label to propagate policy labels to other digital components, processing power and network overhead is reduced by not having to review similar digital components for policy violations.

Figure 5:
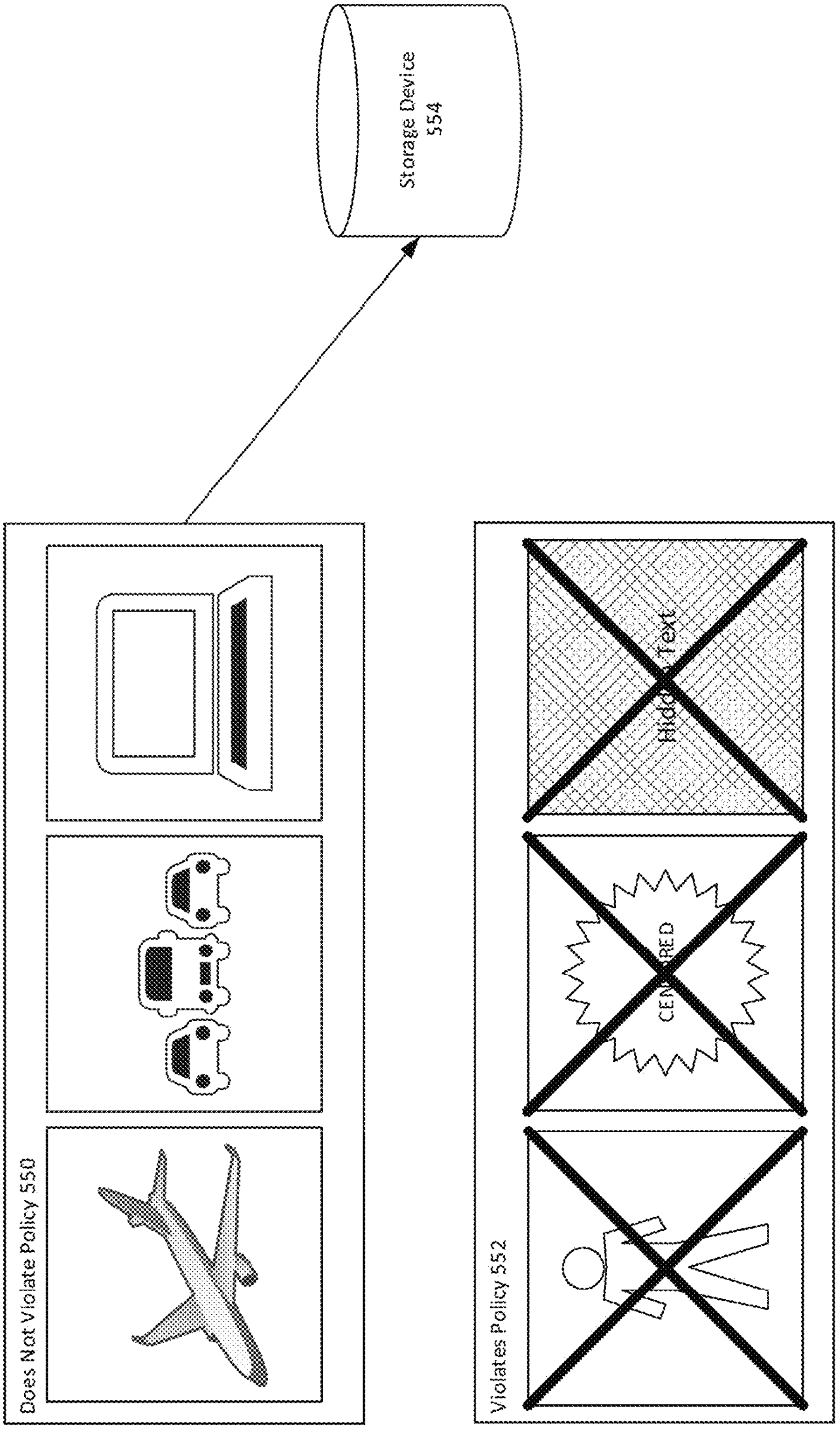
FIG. 5 is a block diagram of stored digital components in accordance with aspects of the disclosure.

FIG. 5 illustrates digital components that have been reviewed by the policy violation prediction system 440. Based on the label associated with the digital components reviewed by policy violation prediction system 440, the digital components may be separated into digital components that do not violate the policy 550 and digital components that violate the policy 552. The digital components that do not violate the policy 550 may be stored in a storage device 554. For example, the digital components that do not violate the policy 550 may be stored in a publisher's storage device 554 such that the non-policy violating digital components 550 can be recalled and provided for output by the publisher in response to a request for digital components.

According to some examples, digital components that have been associated with a policy label indicating that the digital component violates a policy 552 may not be stored in storage device 554. For example, if the policy violation prediction system 440 determines that the digital components violate the policy, the policy violating digital components 552 may not be stored in storage device 554 and, therefore, may not be accessible to a publisher. By not storing the policy violating digital components 552 in storage device 554 and, therefore, making policy violating digital components 552 inaccessible to publishers, policy violating digital components may be prevented from being provided for output. This prevents unwanted, or policy violating, digital components from being provided for output to a user. This may increase computational efficiency by reducing the processing power and network overhead required to provide a replacement digital component for a policy violating digital component. Further, less memory is required as only non-policy violating digital components may be stored in storage device 554, thereby increasing the computational efficiency. Examples of features of a digital component that may be checked for policy violation include one or more of resolution, contrast, dimensions, visual quality, color palette in use, sharpness, presence of a digital watermark, presence of a QR or other code, maliciousness of the content, or the like. Malicious content may be, for example, violative content, such as content that violates a content policy of a host. The aforementioned features of this list may also be considered taking into account the functional capabilities of the target device where the digital component will be viewed.

Label Propagation

Referring back to FIG. 1, the policy labels may be propagated 108 in one or more ways. The policy labels may be propagated 108 using seed based 110 propagation or a neighborhood based 112 propagation. While the seed based 110 and neighborhood based 112 propagation techniques discussed herein are based on the policy violation prediction 106 of the LLM, the seed based 110 and neighborhood based 112 propagation may be used without previously determining a policy violation prediction 106. In such an example, the policy labels may be propagated without LLM review.

According to some examples, when the confidence score of the policy violation prediction for a given digital component is above a threshold, the policy label associated with the digital component may be used to propagate the policy label to other incoming digital components received by the publisher. For example, if the incoming digital component is above a threshold similarity or within a threshold embedding distance to the previously labeled digital component, the incoming digital component may be automatically labeled with the policy label of the previously labeled digital component.

In some examples, when the confidence score of the policy violation prediction for a given digital component is below a threshold, e.g., threshold "X," but above a second threshold, e.g., threshold "Y," a directive write may inject an opinion. For example, when the confidence score is between threshold X and threshold Y for a given digital component, a policy label may be associated with the digital component but will not be propagated to incoming digital components.

According to some examples, propagating labels, whether via a seed based approach or neighborhood based approach, may increase computational efficiency. For example, the number of inputs required to label the digital components may be reduced as only some of the candidate digital components have to be reviewed and labeled before the label can automatically be applied to others. Further, by propagating labels based on content similarity, the amount of processing power and network overhead required to review and label the candidate digital components decreases as only a subset of candidates are reviewed before the labels are propagated to other candidates having similar content and/or content providers.

In some examples, propagating labels to digital components having similar content and/or content providers above a threshold may prevent unwanted digital components from being provided for output by a publisher. For example, if a digital component is labeled with a policy violation label, and that policy violation label is propagated to digital components having similar content and/or are submitted from similar content providers, policy violating digital components may be prevented from being output to users. This avoids the processing power and network overhead required to provide a replacement digital component after the first digital component provided for output is reported for a policy violation as the first digital component is never output in the first place.

Seed Based

According to some examples, the labeled digital components may be provided as seeds into a seed based enforcement system. For example, when the confidence score of the policy violation prediction for a given digital component is above a threshold, the labeled digital component may be provided as a seed and used to propagate the policy label to incoming digital components.

The seeds, or labels associated with the labeled digital components, may be used to identify policy violating digital components based on similarity of content. The seeds may be labeled with a policy label indicating whether a digital component violates a given policy or does not violate the given policy. The policy label may be assigned by a reviewer. The reviewer may be, for example, the LLM model. In some examples, the reviewer may be a human reviewer. In some examples, the policy label may be a policy label applied via label propagation.

The seed may be compared to other digital components to determine if the other digital components are similar to the seed. For example, the content and/or content provider of the other digital components may be compared to the content and/or content provider of the seed. If another digital component is above a threshold similarity to the seed, the label associated with the seed may be applied, or propagated, to the other digital component FIG. 5 is an example method for seed based label propagation.

Figure 6:
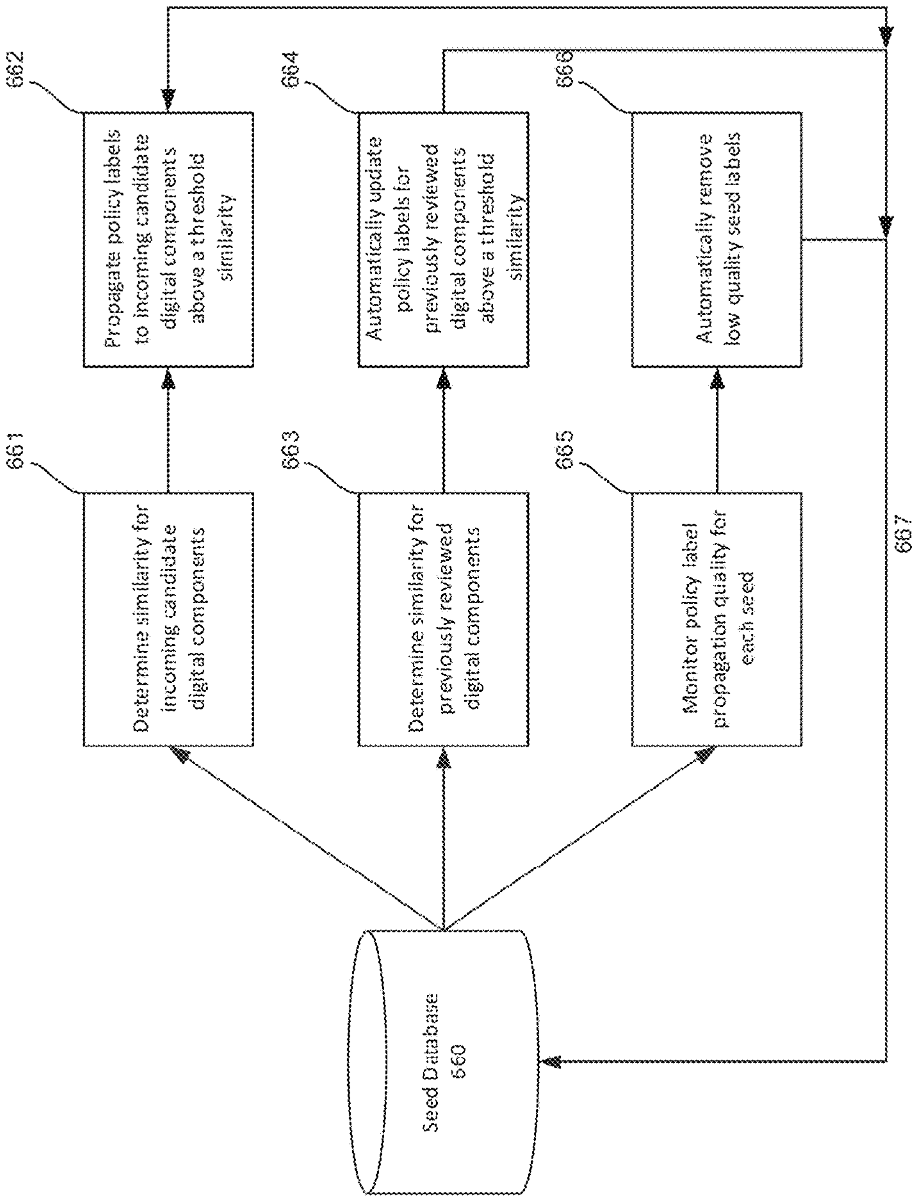
FIG. 6 is a flow diagram of an example method for seed based label propagation in accordance with aspects of the disclosure.

FIG. 6 illustrates an example method of seed based label propagation. A candidate digital component with a policy violation prediction confidence score above a threshold may be provided as a seed into seed database 660. In some examples, the seed database 660 may be populated based on previously reviewed digital components, previously labeled digital components, manual additions of seeds, feedback associated with digital components, policy violation predictions 106, content quality reviews from publishers, or the like.

The seed may include a seed label. The seed label may correspond to the embedding representation for the digital component. For example, the seed label may correspond to the embeddings for a content type and/or content provider for the digital component.

According to some examples, the seed may include a label identifier. The label identifier may correspond to the policy being enforced. For example, each publisher may have a respective policy for their website or mobile application. The policy associated with the publisher's website and/or mobile application may have a respective label identifier.

The seed may include a policy label. The policy label may be "policy violating" or "does not violate policy." The policy label may be based on a policy violation prediction 106, previous label propagation 108, or the like. The policy label may be propagated based on one or more determinations, such as those described with respect to block 661, 663, and 665.

In block 661, the similarity for incoming candidate digital components may be determined. The similarity for incoming candidate digital components may be the similarity between the content type and/or content provider of incoming candidate digital components. The similarity may be determined based on an embedding distance between the content type and/or content provider of the incoming candidate digital components and content type and/or content provider of the seeds in the seed database 660.

In block 662, if the similarity between the incoming candidate digital components is above a threshold similarity, the policy label may be propagated to the incoming candidate digital components. In some examples, if the embedding distance between the content type and/or content provider of the incoming candidate digital components is less than a threshold distance, the policy label of the seed may be propagated to the incoming candidate digital component. In contrast, if the similarity is below a threshold or the embedding distance is greater than a threshold distance, the policy label may not be propagated.

In block 663, the similarity for previously reviewed candidate digital components may be determined. The similarity for previously reviewed digital components may be the similarity between the content type and/or content provider of previously reviewed candidate digital components and seeds within seed database 660. The similarity may be determined based on an embedding distance between the content type and/or content provider of the previously reviewed candidate digital components and the seeds.

In block 664, if the similarity between the previously reviewed digital components is above a threshold similarity, the policy label may be propagated to the previously reviewed digital components. In some examples, if the embedding distance between the content type and/or content provider of the previously reviewed digital components is less than a threshold distance, the policy label of the seed may be propagated to the previously reviewed digital component. According to some examples, propagating the label of the seed to the previously reviewed digital components may include updating the policy label associated with the previously reviewed digital components. In contrast, if the similarity is below a threshold or the embedding distance is greater than a threshold distance, the policy label may not be propagated or updated.

In block 665, the policy label propagation quality for each seed may be monitored. The quality of the seeds may be determined based on the rate of sustained propagated labels for a given seed. For example, if the determined policy violation of the seed is appealed by the submitter of the digital component, corrected after additional review, or the like, the quality of the label of the seed may be low. In contrast, if the determined policy violation of a given seed is maintained, e.g., not appealed, changed, or the like, the quality of the label may be determined to be acceptable, good, etc.

In block 666, if the label propagation quality is below a threshold, the seed labels associated with the seeds, e.g., digital components, may be removed. For example, if the quality of the seed is determined to be low, the seed may be removed from the seed database such that the label of the given seed is not used for propagation.

Feedback loop 667 may update the seed database 660 based on the propagated policy labels 662, updated policy labels 664, and/or removed seed labels 666.

Seed based label propagation may allow for policy labels to be quickly and automatically applied to digital components within a threshold embedding distance or above a threshold similarity to seeds within the seed database 660. This may increase the computation efficiency of the system by reducing the number of times a digital component has to be reviewed, how many digital components have to be reviewed, or the like. Further, by automatically propagating policy labels based on being within a threshold embedding distance and/or above a threshold similarity, the consistency of policy labels may be increased. For example, the subjectivity of the policy violation prediction is removed by using the embedding distance or similarity scores. This increases the consistency and may increase the computational efficiency of the system as a whole.

Neighborhood Based

According to some examples, both the labeled and unlabeled digital components may be provided as input into a neighborhood graph. Neighborhood graphs may be, for example, a graphical representation of the similarity of digital components. The similarity may be determined based on the content, content provider, etc. of the digital component. The policy label of the labeled digital components may be applied, or propagated, to neighboring digital components. The neighboring digital components may be, for example, digital components within a threshold embedding distance, above a threshold similarity, or the like.

According to some examples, a ML model may predict, based on the neighborhood graph and the labeled digital components, a confidence score. The confidence score may correspond to a probability of a policy violation. In some examples, the confidence score may be used to determine whether to propagate the policy label of the labeled digital components to neighboring digital components. For example, the ML model may receive, as training data, embeddings associated with the digital components, policy labels of previously labeled digital components, distance scores indicating the similarity of content between neighboring digital components, and/or LLM results. The ML model may be trained to predict a confidence score corresponding to a probability of a policy violation. The confidence score may be used to determine whether to propagate policy labels to neighboring digital components. In some examples, when executing the ML model, the ML may receive, as input, the policy labels, distance scores, and LLM results for a given candidate digital component. The ML model may predict a confidence score for the given candidate digital component.

The confidence score of the ML model may be compared to two or more thresholds. A first threshold may be a higher threshold and a second threshold may be a lower threshold. The lower threshold may be a threshold less than the higher threshold. The higher threshold and lower thresholds may, in some examples, correspond to confidence scores. In examples where the confidence score of a digital component exceeds the higher threshold, the digital component may be automatically labeled with the policy label of the neighboring digital component. In some examples, if the confidence score of a digital component exceeds the lower threshold but not the higher threshold, the digital component may be returned to the funneling as part of the feedback loop. In such an example, the digital component may get evaluated by the LLM if the digital component is not filtered out during the funnel stage.

Figure 7:
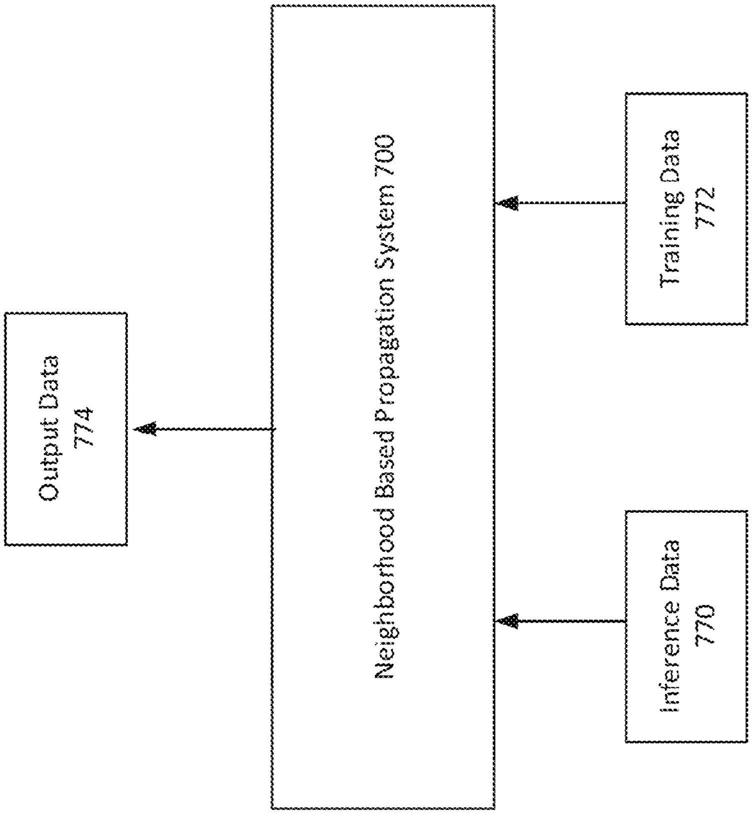
FIG. 7 is a block diagram of an example system in accordance with aspects of the disclosure.

FIG. 7 depicts a block diagram of an example neighborhood based propagation system 700, which can be implemented on one or more computing devices. The neighborhood based propagation system 700 can be configured to receive inference data 770 and/or training data 772 for use in determining the probability a digital component is policy violating. For example, the neighborhood based propagation system 700 can receive the inference data 770 and/or training data 772 as part of a call to an application programming interface (API) exposing the neighborhood based propagation system 700 to one or more computing devices. Inference data 770 and/or training data 772 can also be provided to the neighborhood based propagation system 700 through a storage medium, such as remote storage connected to the one or more computing devices over a network. Inference data 770 and/or training data 772 can further be provided as input through a user interface on a client computing device coupled to the neighborhood based propagation system 700.

The inference data 770 can include data associated with determining the probability that a digital component violates a policy. The inference data 770 may include features derived from the neighborhood. The features derived from the neighborhood may include, for example, the policy label rate among "N" number of neighbors or neighbors within a predefined distance. According to some examples, the features may be node level features. The node level features may be, for example, attributes associated with a digital component. For example, the node level features may include image embeddings, video embeddings, embeddings associated with the content provider, etc.

The training data 772 can correspond to an artificial intelligence (AI) task, such as a machine learning task, for determining the probability of a digital component violating a policy, such as a task performed by a neural network. The training data 772 can be split into a training set, a validation set, and/or a testing set. An example training/validation/testing split can be an 80/10/10 split, although any other split may be possible. The training data 772 can include examples for digital components that are policy violating and digital components that are non-policy violating. The digital components provided as training data may include policy labels, providing an indication as to whether the digital component is policy violating or non-policy violating.

The training data 772 can be in any form suitable for training a model, according to one of a variety of different learning techniques. Learning techniques for training a model can include supervised learning, unsupervised learning, and semi-supervised learning techniques. For example, the training data 772 can include multiple training examples that can be received as input by a model. The training examples can be labeled with a desired output for the model when processing the labeled training examples. The label and the model output can be evaluated through a loss function to determine an error, which can be back propagated through the model to update weights for the model. For example, if the machine learning task is a classification task, the training examples can be images labeled with one or more classes categorizing subjects depicted in the images. As another example, a supervised learning technique can be applied to calculate an error between outputs, with a ground-truth label of a training example processed by the model. Any of a variety of loss or error functions appropriate for the type of the task the model is being trained for can be utilized, such as cross-entropy loss for classification tasks, or mean square error for regression tasks. The gradient of the error with respect to the different weights of the candidate model on candidate hardware can be calculated, for example using a backpropagation algorithm, and the weights for the model can be updated. The model can be trained until stopping criteria are met, such as a number of iterations for training, a maximum period of time, a convergence, or when a minimum accuracy threshold is met.

From the inference data 770 and/or training data 772, the neighborhood based propagation system 700 can be configured to output one or more results related to inferences of digital components and the probability of the digital components violating a policy generated as output data 774. For example, the neighborhood based propagation system 700 may be executed to run inference on new incoming digital components for policy review. The neighborhood based propagation system 700 may be executed on the new, e.g., unseen, digital components and provide, as output data 774, a probability score of how likely the neighborhood based propagation system 700 determines the digital component is policy violating. The probability score may correspond to a confidence score. If the score is above a threshold, the digital component may be labeled with a policy label.

As examples, the output data 774 can be any kind of score, classification, or regression output based on the input data. Correspondingly, the AI or machine learning task can be a scoring, classification, and/or regression task for predicting some output given some input. These AI or machine learning tasks can correspond to a variety of different applications in processing images, video, text, speech, or other types of data to determine the probability that a digital component is policy violating. The output data can include instructions associated with determining the probability that a digital component is policy violating and determining further action based on the policy violation.

As an example, the neighborhood based propagation system 700 can be configured to send the output data 774 for display on a client or user display. As another example, the neighborhood based propagation system 700 can be configured to provide the output data 774 as a set of computer-readable instructions, such as one or more computer programs. The computer programs can be written in any type of programming language, and according to any programming paradigm, e.g., declarative, procedural, assembly, object-oriented, data-oriented, functional, or imperative. The computer programs can be written to perform one or more different functions and to operate within a computing environment, e.g., on a physical device, virtual machine, or across multiple devices. The computer programs can also implement functionality described herein, for example, as performed by a system, engine, module, or model. The neighborhood based propagation system 700 can further be configured to forward the output data 774 to one or more other devices configured for translating the output data 774 into an executable program written in a computer programming language. The neighborhood based propagation system 700 can also be configured to send the output data 774 to a storage device for storage and later retrieval.

In some examples, the neighborhood based propagation system 700 may be configured to add or remove digital components from a storage device, such as a publisher's storage device, based on the output data 774, e.g., the probability that the digital component violates a policy. For example, referring back to FIG. 5, if the probability, or confidence score, that the digital component violates a policy is above a threshold, the digital component may not be transmitted to a storage device 554. By not transmitting the policy violating digital component to storage device 554, the policy violating digital component may not be selected by a publisher to be provided for output. This prevents policy violating digital components from being provided for output to a user. By preventing policy violating digital components from being stored in storage device 554, the computational efficiency of the system increases by decreasing the amount of memory, or storage space required, and increasing computational efficiency and processing by not having to provide a replacement digital component for a policy violating digital component.

Figure 8A:
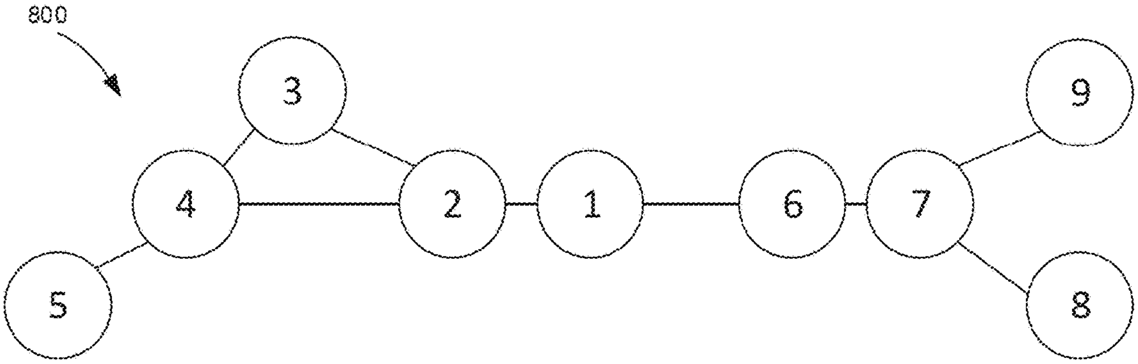
FIGS. 8A-8C are pictorial diagrams illustrating an example method of neighborhood based label propagation in accordance with aspects of the disclosure.
Figure 8B:
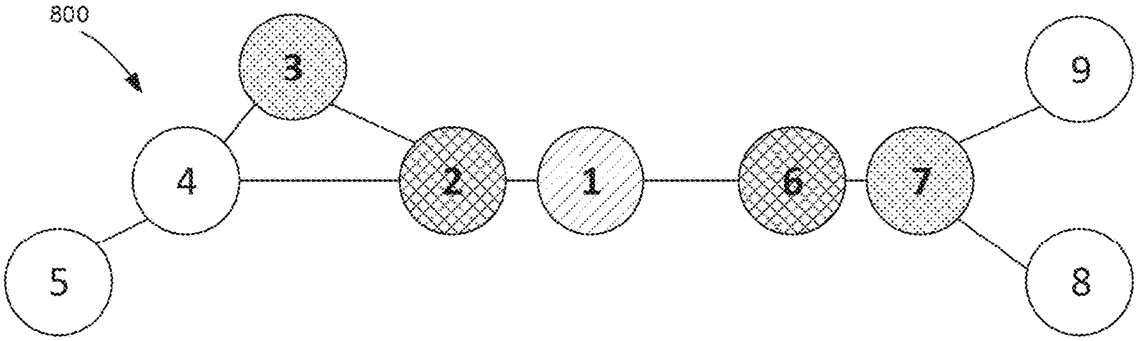
Figure 8C:
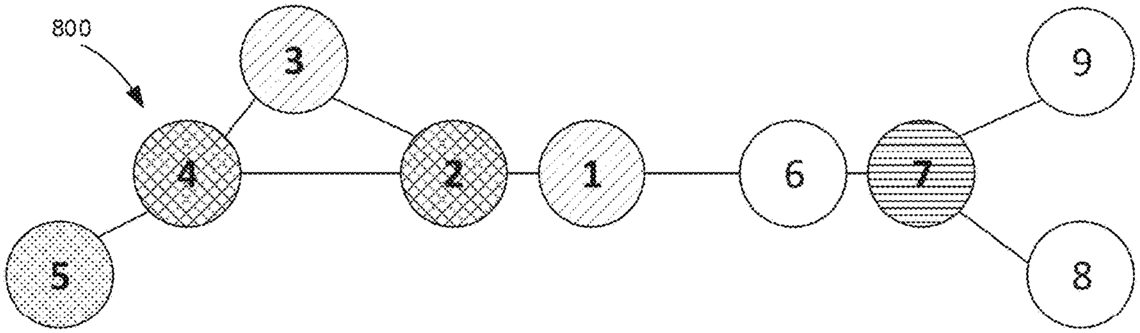

FIGS. 8A-8C illustrate a sequence of neighborhood graphs corresponding to neighborhood based label propagation. Each circle in the figures represents a respective digital component, e.g., digital components 1-9. The distance between any two digital components may correspond to a similarity between the digital components. The distance may be, for example, a Euclidean distance. The distance may be determined based on embeddings associated with the digital components. As shown, the neighborhood graphs may include a line connecting any two digital components when the similarity between the two digital components is above a threshold similarity. In some examples, in addition to or as an alternative of, the similarity may be represented based on the distance between the digital components.

FIG. 8A illustrates a neighborhood graph 800 at time ("t")=0. At time t=0, the similarity of the digital components, the neighborhood graph may indicate that none of the digital components violate a policy. The determination may be made before any information, such as a policy violation prediction, is available to the system. For example, the determination may be made upon the system receiving the candidate digital component. At the time the system receives the candidate digital component, additional information regarding policy violations may not be available. In such an example, at the time the system receives the candidate digital component, the candidate digital component has not yet been reviewed for a policy violation. Accordingly, all digital components, before any review, e.g., at t=0, may be non-policy violating digital components.

FIG. 8B illustrates the neighborhood graph 800 at t=1. At t=1, at least one digital component may have been identified as policy violating. For example, the policy violation prediction system 440 may have predicted, with a confidence value greater than a threshold confidence value, that digital component 1 is policy violating, as indicated by the diagonal line shading. The policy violating label associated with digital component 1 may be automatically propagated to digital components 2 and 6 with high certainty, due to their similarity to digital component 1, as indicated by the hatched shading of digital components 2 and 6. The policy violating label associated with digital component 1 may be automatically propagated to digital components 2 and 7 with low certainty, as indicated by the dot shading of digital components 2 and 7. When a policy label is propagated with high certainty, additional review of the digital components may not be required. When a policy label is propagated with low certainty, the digital component may be flagged for further review.

FIG. 8C illustrates the neighborhood graph 800 at t=2. At t=2, digital component 3 may have been identified as policy violating, as indicated by the diagonal line shading, and digital component 7 may have been identified as non-policy violating, by the horizontal line shading. The policy violation may have, in some examples, been determined by policy violation prediction system 440 and/or neighborhood based propagation system 700.

Based on the determination that digital component 3 is policy violating, the neighborhood graph may be updated to propagate policy violation labels to digital components 2 and 4 with high certainty, as indicated by the hatched shading, and digital component 5 with low certainty, as indicated by the dot shading.

In some examples, based on the determination that digital component 7 is non-policy violating, the policy violation label that was previously propagated to digital component 6 may be removed as digital component 6 may be more similar to digital component 7 than digital component 1. Digital component 6 may be more similar to digital component 7 than digital component 1 as the distance between digital component 6 and digital component 7 is less than the distance between digital component 6 and digital component 1. As the distance between digital components 6 and 7 is less than the distance between digital components 6 and 1, the non-policy violating label may be propagated to digital component 6 with high certainty.

The neighborhood graph 800 may continue to be updated based on the policy violation predictions provided by policy violation prediction system 440 and/or neighborhood based propagation system 700. As the neighborhood graph is updated, the policy labels may be updated and propagated.

Feedback Loop

Labeled digital components, labeled based on the LLM prediction or through label propagation, may be provided as inference and/or training data to predict a policy violation probability for incoming digital components. For example, the labeled digital components may be provided as interference and/or training data to the funneling stage 104, shown as feedback loop 114 in FIG. 1. In such an example, the labeled digital components may be used to funnel, or filter, additional candidate digital components for further policy review by the LLM. In some examples, the labeled digital components may be provided as inference and/or training data to the seed database 660, as shown in FIG. 6. In such an example, the labeled digital components may be used for seed based propagation of policy labels. In another example, the labeled digital components may be provided as inference and/or training data to the neighborhood based propagation system 700, as shown in FIG. 7.

According to some examples, the LLM labeled digital components may be separated into subsets. The subsets may be determined based on, for example, the confidence scores. In some examples, only a subset of the LLM labeled digital components may be provided as inference and/or training data. For example, LLM labeled digital components with a confidence score above a threshold may be provided as part of the feedback loop while LLM labeled digital components with a confidence below the threshold may not be provided as part of the feedback loop.

Example System

Figure 9:
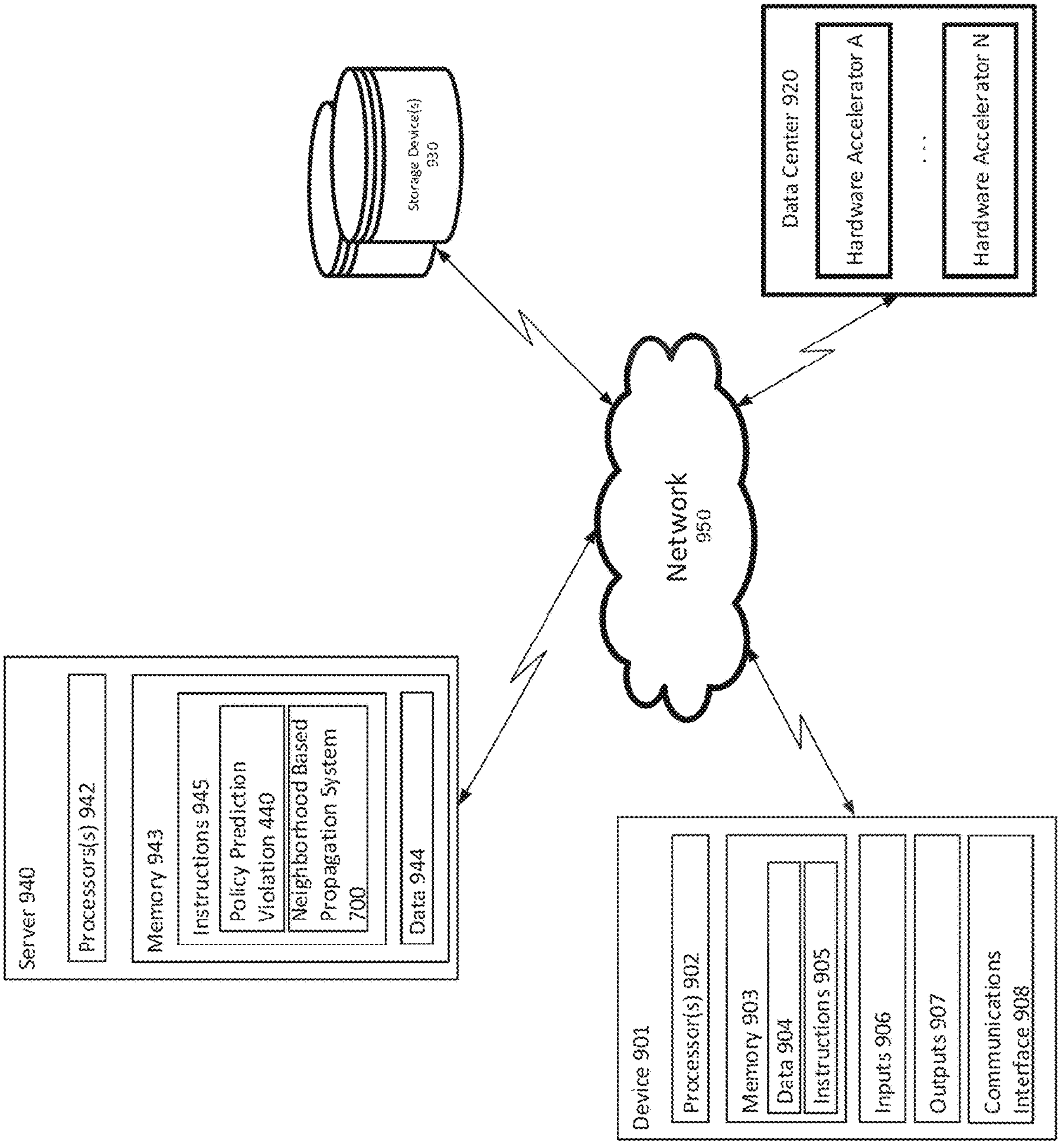
FIG. 9 is a block diagram of an example system in accordance with aspects of the disclosure.

FIG. 9 illustrates an example system in which the features described above and herein may be implemented. It should not be considered as limiting the scope of the disclosure or usefulness of the features described herein. In this example, system 900 includes device 901, server 940, storage devices 930, data center 920, and network 950.

Device 901 may be a user device. Device 901 may include one or more processors 902, memory 903, data 904 and instructions 905. Device 901 may also include inputs 906, outputs 907, and a communications interface 908. The devices 901 may be, for example, a smart phone, tablet, laptop, smart watch, AR/VR headset, smart helmet, home assistant, etc.

Memory 903 of device 901 may store information that is accessible by processor 902. Memory 903 may also include data that can be retrieved, manipulated or stored by the processor 902. The memory 903 may be of any non-transitory type capable of storing information accessible by the processor 902, including a non-transitory computer-readable medium, or other medium that stores data that may be read with the aid of an electronic device, such as a hard-drive, memory card, read-only memory (ROM), random access memory (RAM), optical disks, as well as other write-capable and read-only memories. Memory 903 may store information that is accessible by the processors 902, including instructions 905 that may be executed by processors 902, and data 904.

Data 904 may be retrieved, stored or modified by processors 902 in accordance with instructions 905. For instance, although the present disclosure is not limited by a particular data structure, the data 904 may be stored in computer registers, in a relational database as a table having a plurality of different fields and records, XML documents, or flat files. The data 904 may also be formatted in a computer-readable format such as, but not limited to, binary values, ASCII or Unicode. By further way of example only, the data 904 may comprise information sufficient to identify the relevant information, such as numbers, descriptive text, proprietary codes, pointers, references to data stored in other memories (including other network locations) or information that is used by a function to calculate the relevant data.

The instructions 905 can be any set of instructions to be executed directly, such as machine code, or indirectly, such as scripts, by the processor 902. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

The one or more processors 902 may include any conventional processors, such as a commercially available CPU or microprocessor. Alternatively, the processor can be a dedicated component such as an ASIC or other hardware-based processor. Although not necessary, device 901 may include specialized hardware components to perform specific computing functions faster or more efficiently.

Although FIG. 9 functionally illustrates the processor, memory, and other elements of device 901 as being within the same respective blocks, it will be understood by those of ordinary skill in the art that the processor or memory may actually include multiple processors or memories that may or may not be stored within the same physical housing. Similarly, the memory may be a hard drive or other storage media located in a housing different from that of device 901. Accordingly, references to a processor or device will be understood to include references to a collection of processors or devices or memories that may or may not operate in parallel.

The inputs 906 may be, for example, a mouse, keyboard, touchscreen, microphone, camera, image capturing device, or any other type of input.

Output 907 may be a display, such as a monitor having a screen, a touchscreen, a projector, or a television. The display 907 of the device 901 may electronically display information to a user via a graphical user interface (GUI) or other types of user interfaces. For example, display 907 may electronically display information associated with digital components received in response to receiving an input corresponding to the selection of input 906. In some examples, display 907 may electronically display one or more additional inputs available for selection. The additional inputs may provide access to additional information associated with the digital component, the digital content, or the like.

The devices 901 can be at various nodes of a network 950 and capable of directly and indirectly communicating with other nodes of network 950. Although a single device is depicted in FIG. 9, it should be appreciated that a typical system can include one or more devices, with each device being at a different node of network 950. The network 950 and intervening nodes described herein can be interconnected using various protocols and systems, such that the network can be part of the Internet, World Wide Web, specific intranets, wide area networks, or local networks. The network 950 can utilize standard communications protocols, such as WiFi, Bluetooth, 4G, 5G, etc., that are proprietary to one or more companies. Although certain advantages are obtained when information is transmitted or received as noted above, other aspects of the subject matter described herein are not limited to any particular manner of transmission.

Storage devices 930 can be a combination of volatile and non-volatile memory and can be at the same or different physical locations than the computing devices. For example, the storage devices 930 can include any type of non-transitory computer readable medium capable of storing information, such as a hard-drive, solid state drive, tape drive, optical storage, memory card, ROM, RAM, DVD, CD-ROM, write-capable, and read-only memories. The storage devices may be configured to store non-policy violating digital components 550. In some examples, the storage devices 930 may include the seed database 660. In another example, the storage devices 930 may be configured to store the training and/or inference data for the neighborhood based propagation system 700.

Device 901 and the server 940 can be communicatively coupled to one or more storage devices 930 over a network 950. The storage devices 930 can be a combination of volatile and non-volatile memory and can be at the same or different physical locations than the computing devices. For example, the storage devices 930 can include any type of non-transitory computer readable medium capable of storing information, such as a hard-drive, solid state drive, tape drive, optical storage, memory card, ROM, RAM, DVD, CD-ROM, write-capable, and read-only memories.

The server 940 can include one or more processors 942 and memory 943, instructions 945, and data 944. These components may operate in the same or similar fashion as those described above with respect to device 901. The memory 943 can store information accessible by the processors 942, including instructions 945 that can be executed by the processors 942. The memory 943 can also include data that can be retrieved, manipulated, or stored by the processors 942. The memory 943 can be a type of non-transitory computer readable medium capable of storing information accessible by the processors 942, such as volatile and non-volatile memory. The processors 942 can include one or more central processing units (CPUs), graphic processing units (GPUs), field-programmable gate arrays (FPGAs), and/or application-specific integrated circuits (ASICs), such as tensor processing units (TPUs).

The instructions 945 can include one or more instructions that, when executed by the processors, cause the one or more processors to perform actions defined by the instructions. The instructions 945 can be stored in object code format for direct processing by the processors, or in other formats including interpretable scripts or collections of independent source code modules that are interpreted on demand or compiled in advance. The instructions can include instructions for implementing a policy prediction violation system 440, which can correspond to the policy prediction violation system of FIG. 4 and/or a neighborhood based propagation system 700, which can correspond to the neighborhood based propagation system 700 of FIG. 71. The policy prediction violation system 440 and/or neighborhood based propagation system 700 can be executed using the processors 942, and/or using other processors remotely located from the server 940.

The data 944 can be retrieved, stored, or modified by the processors 942 in accordance with the instructions 945. The 944 data can be stored in computer registers, in a relational or non-relational database as a table having a plurality of different fields and records, or as JSON, YAML, proto, or XML documents. The data 944 can also be formatted in a computer-readable format such as, but not limited to, binary values, ASCII, or Unicode. Moreover, the data 944 can include information sufficient to identify relevant information, such as numbers, descriptive text, proprietary codes, pointers, references to data stored in other memories, including other network locations, or information that is used by a function to calculate relevant data.

The server 940 can be configured to transmit data to the device 901, and the device 901 can be configured to display at least a portion of the received data on a display implemented as part of the user output. The user output can also be used for displaying an interface between the device 901 and the server 940. The user output can alternatively or additionally include one or more speakers, transducers or other audio outputs, a haptic interface or other tactile feedback that provides non-visual and non-audible information to the platform user of the device 901.

Although FIG. 9 illustrates the processors 942 and the memories 943 as being within the computing devices, components described herein can include multiple processors and memories that can operate in different physical locations and not within the same computing device. For example, some of the instructions and the data can be stored on a removable SD card and others within a read-only computer chip. Some or all of the instructions and data can be stored in a location physically remote from, yet still accessible by, the processors. Similarly, the processors can include a collection of processors that can perform concurrent and/or sequential operation. The computing devices can each include one or more internal clocks providing timing information, which can be used for time measurement for operations and programs run by the computing devices.

The server 940 can be connected over the network 950 to a data center 920 housing any number of hardware accelerators. The data center 920 can be one of multiple data centers or other facilities in which various types of computing devices, such as hardware accelerators, are located. Computing resources housed in the data center 920 can be specified for deploying models related to predicting a policy violation and propagation policy labels, as described herein.

The server 940 can be configured to receive requests to process data from the device 901 on computing resources in the data center 920. For example, the environment can be part of a computing platform configured to provide a variety of services to users, through various user interfaces and/or application programming interfaces (APIs) exposing the platform services. The variety of services can include predicting whether a digital component violates a policy, propagating policy labels to incoming digital components, or the like.

As other examples of potential services provided by a platform implementing the environment, the server 940 can maintain a variety of models in accordance with different constraints available at the data center. For example, the server 940 can maintain different families for deploying models on various types of TPUs and/or GPUs housed in the data center or otherwise available for processing.

Figure 10:
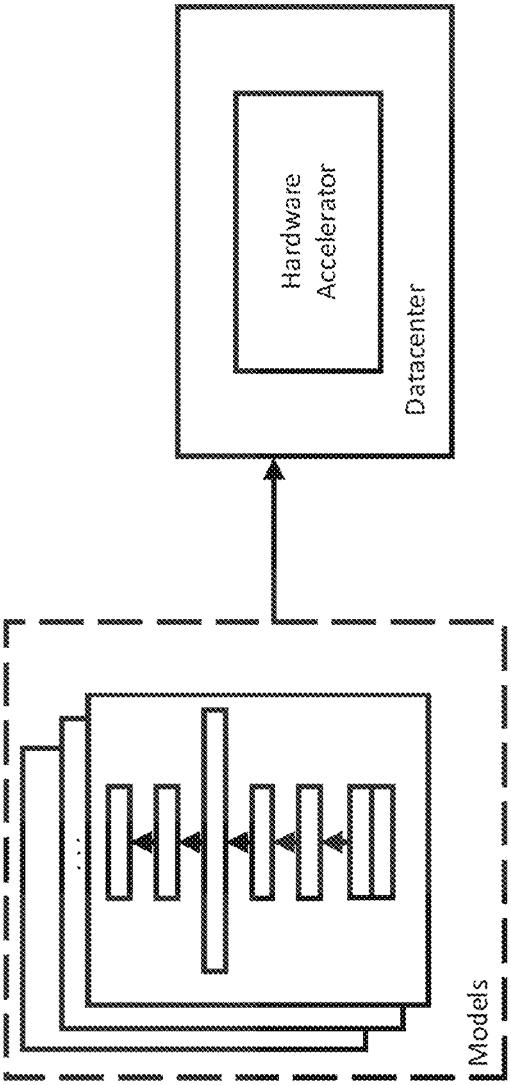
FIG. 10 is a block diagram illustrating example model architectures in accordance with aspects of the disclosure.

FIG. 10 depicts a block diagram illustrating one or more model architectures, such as for deployment in a data center housing a hardware accelerator on which the deployed models will execute for predicting whether a digital component violates a policy, neighborhood based label propagation, or the like. The hardware accelerator can be any type of processor, such as a CPU, GPU, FPGA, or ASIC such as a TPU.

An architecture of a model can refer to characteristics defining the model, such as characteristics of layers for the model, how the layers process input, or how the layers interact with one another. For example, the model can be a convolutional neural network (ConvNet) that includes a convolution layer that receives input data, followed by a pooling layer, followed by a fully connected layer that generates a result. The architecture of the model can also define types of operations performed within each layer. For example, the architecture of a ConvNet may define that rectified linear unit (ReLU) activation functions are used in the fully connected layer of the network. One or more model architectures can be generated that can output results associated with predicting whether a digital component violates a policy, neighborhood based label propagation, or the like.

Referring back to FIG. 9, although a single server 940, device 901, and data center 920 are shown, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing optimization models, and any combination thereof.

Example Method

Figure 11:
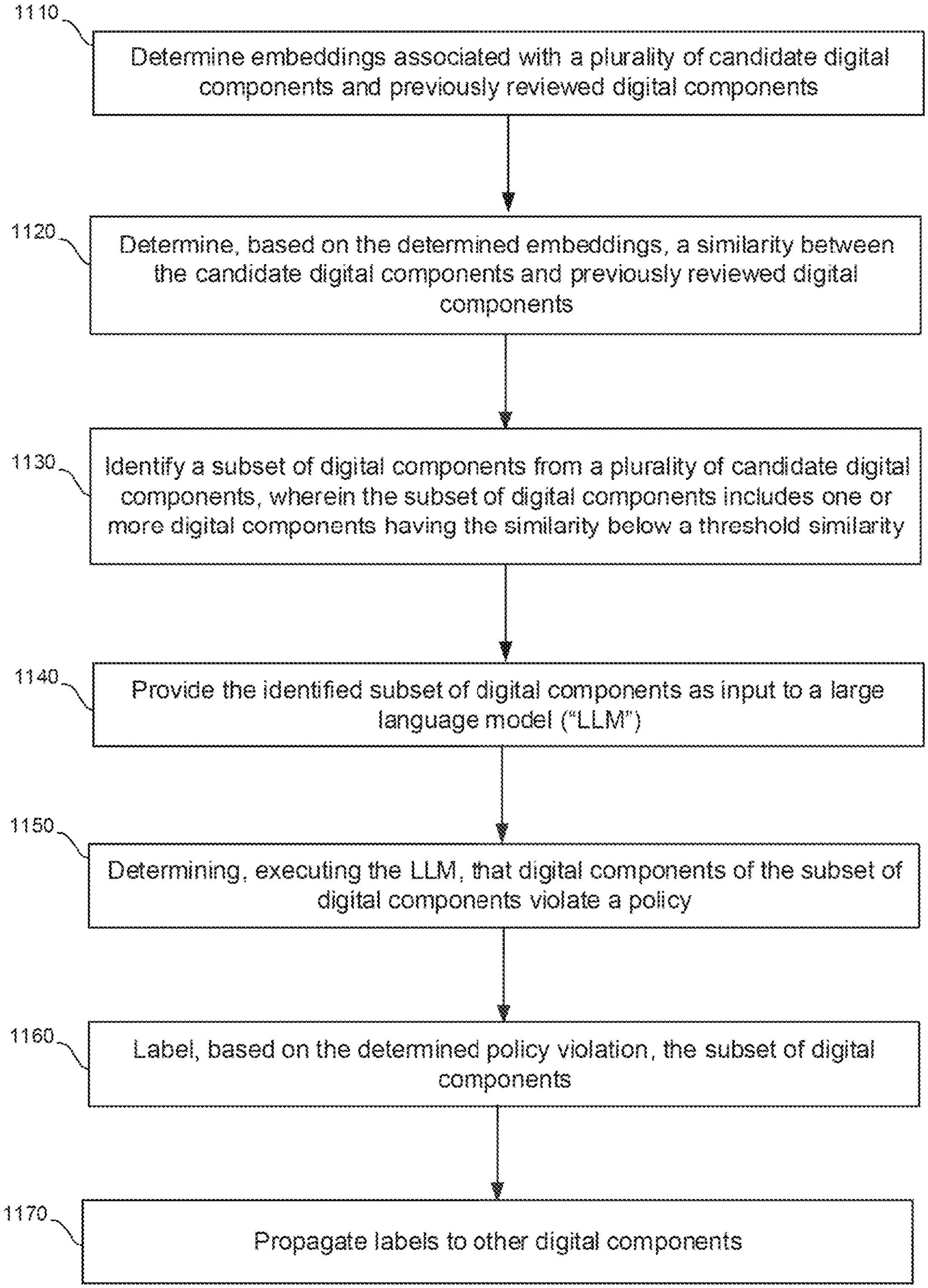
FIG. 11 is a flow diagram for an example method of propagating policy labels in accordance with aspects of the disclosure.

FIG. 11 illustrates an example method for propagating labels to digital components. The following operations do not have to be performed in the precise order described below. Rather, various operations can be handled in a different order or simultaneously, and operations may be added or omitted.

In block 1110, embeddings associated with a plurality of candidate digital components and previously reviewed digital components may be determined. The previously reviewed digital components may comprise at least one previously reviewed labeled digital component or previously reviewed unlabeled digital component. The embeddings may be determined using a ML model. The embeddings may be a representation of the content type, content provider, or other information associated with a given digital component.

In block 1120, a similarity between the candidate digital components and previously reviewed digital components may be determined based on the embeddings. The similarity may comprise at least one of a content similarity or a content provider similarity. The similarity may be determined based on a comparison of the embeddings of digital components. For example, the distance between any two digital components may correspond to a similarity between the digital components. The digital components may be compared to previously labeled digital components, previously reviewed but unlabeled digital components, or the like.

In block 1130, a subset of digital components may be identified from the plurality of candidate digital components. The subset of digital components may include one or more digital components having the similarity below a threshold similarity. According to some examples, the one or more digital components may be identified by filtering the plurality of candidate digital components. The candidate digital components may be filtered based on a threshold similarity, whether the candidate digital components have been previously reviewed, whether the candidate digital components have an associated label, etc.

According to some examples, when the similarity is above a threshold, a second subset of the digital components may be removed from the plurality of candidate digital components. The second subset of digital components may include one or more digital components having the similarity above the threshold similarity. For example, the similarity may be used to filter candidate digital components. The similarity may be the similarity between a candidate digital component and a previously reviewed digital component, whether labeled or unlabeled. When the similarity is above a threshold similarity, the candidate digital component may be filtered from further review. In contrast, when the similarity is below a threshold similarity, the candidate digital component may be marked for further review.

According to some examples, when the similarity between the candidate digital component and a previously reviewed digital component is above the threshold similarity, the candidate digital component may be labeled with the policy label of the previously reviewed digital component. The candidate digital component may be labeled using seed based label propagation and/or neighborhood based label propagation.

In some examples, when identifying the second subset of digital components from the plurality of candidate digital components, previously labeled digital components may be removed. Removing previously labeled digital components may include, for example, filtering the previously labeled digital components from further policy review.

In block 1140, the identified subset of digital components may be provided as input to a large language model ("LLM"). The LLM may be trained to provide a confidence score associated with the policy violation prediction. The policy violation prediction may be "violates policy" or "does not violate policy."

In block 1150, the LLM may be executed to determine that digital components of the subset of digital components violate a policy. Determining that the digital components violate the policy may include determining a binary response to at least one prompt. The binary response may be, for example, a yes or no. The at least one prompt may be generated based on the policy. According to some examples, a digital component may violate a first policy but not a second policy. In such an example, the prompts for the first policy may be different than the prompts for the second policy.

In block 1160, the subset of digital components may be labeled based on the determined policy violation. The determined policy violation may be "violates policy" or "does not violate policy." In some examples, a label may only be applied when the determined policy violation is "violates policy." In such an example, digital components that do not violate the policy may not be labeled. In another example, a label may be applied regardless of the policy violation. For example, when the determined policy violation is "violates policy" a "violates policy" label may be associated with the policy violating digital component. In an example where the determined policy violation is "does not violate policy," a "does not violate policy" label may be associated with the non-policy violating digital component.

In block 1170, the labels may be propagated to other digital components. The other digital components may be outside the subset of digital components. The other digital components may include at least one of a previously reviewed labeled digital component, a previously reviewed unlabeled digital component, or an unlabeled digital component.

The labels may be propagated using seed based label propagation or neighborhood based label propagation. According to one example, the labels may be propagated by identifying neighboring digital components. Neighboring digital components may include, for example, unlabeled digital components within a threshold embedding distance of the labeled one or more digital components. The neighboring digital components may be labeled with a policy label corresponding to the label of the one or more digital components.

According to some examples, it may be determined whether the LLM has determined a policy violation for a candidate digital component. In examples where the candidate digital component has a previously determined policy violation, the plurality of digital components may be deduplicated to remove the candidate digital component with the previously determined policy violation.

The term "configured" is used herein in connection with systems and computer program components. For a system of one or more computers to be configured to perform particular operations or actions means that the system has installed on it software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" refers to data processing hardware and encompasses various apparatus, devices, and machines for processing data, including programmable processors, a computer, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The data processing apparatus can include special-purpose hardware accelerator units for implementing machine learning models to process common and compute-intensive parts of machine learning training or production, such as inference or workloads. Machine learning models can be implemented and deployed using one or more machine learning frameworks, such as a TensorFlow framework, a Microsoft Cognitive Toolkit framework, an Apache Singa framework, or an Apache MXNet framework, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a stand-alone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components, or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purposes logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A method, comprising:

determining, by one or more processors, embeddings associated with a plurality of candidate digital components and previously reviewed digital components;

determining, by one or more processors based on the determined embeddings, a similarity between the candidate digital components and previously reviewed digital components, the similarity comprising at least one of a content similarity or a content provider similarity;

identifying, by the one or more processors, a subset of digital components from the plurality of candidate digital components, wherein the subset of digital components includes one or more digital components having the similarity below a threshold similarity;

providing, by the one or more processors, the identified subset of digital components as input to a machine learning model;

determining, by the one or more processors executing the machine learning model, that digital components of the subset of digital components violate a policy;

generating as output, by the one or more processors executing the machine learning model, based on the determined policy violation, one or more labels for the subset of digital components; and propagating, by the one or more processors, after the one or more labels are output for the subset of digital components by the machine learning model, the one or more labels to other digital components, wherein the other digital components are outside of the subset of digital components.

2. The method of claim 1, further comprising removing, by the one or more processors from the plurality of candidate digital components, a second subset of digital components from the plurality of candidate digital components, wherein the second subset of digital components includes one or more digital components having the similarity above the threshold similarity.

3. The method of claim 2, further comprising:

identifying, by the one or more processors, the previously reviewed digital component having a greater similarity to the second subject of digital components; and labeling the second subset of digital components with a policy violation label of the previously reviewed digital component having the greater similarity.

4. The method of claim 1, wherein:

the previously reviewed digital components comprises at least one of a previously reviewed labeled digital component or a previously reviewed unlabeled digital component; and when identifying the one or more digital components, the method further comprises removing, from the plurality of candidate digital components, the previously reviewed labeled digital component.

5. The method of claim 1, further comprising:

determining, by the one or more processors, whether the machine learning model has determined a policy violation for a candidate digital component; and deduplicating the plurality of candidate digital components to remove the candidate digital component having a previously determined policy violation.

6. The method of claim 1, wherein when determining that the one or more digital components violates the policy, the method further comprises determining, by the one or more processors executing the machine learning model, a binary response to at least one prompt.

7. The method of claim 6, wherein the binary response is a yes or a no.

8. The method of claim 6, wherein the at least one prompt is generated based on the policy.

9. The method of claim 1, wherein when propagating the labels to the other digital components, the method further comprises:

identifying, by the one or more processors based on the determined embeddings, neighboring digital components; and labeling, by the one or more processors, neighboring digital components with a policy label corresponding to a policy label of the subset of digital components.

10. The method of claim 9, wherein the neighboring digital components include unlabeled digital components within a threshold embedding distance of one or more of the subset of digital components.

11. The method of claim 1, wherein the other digital components include at least one of a previously reviewed labeled digital component, a previously reviewed unlabeled digital component, or an unlabeled digital component.

12. The method of claim 1, wherein the machine learning model is a large language model ("LLM").

13. A system, comprising:

one or more processors, the one or more processors configured to:

determine embeddings associated with a plurality of candidate digital components and previously reviewed digital components;

determine, based on the determined embeddings, a similarity between the candidate digital components and previously reviewed digital components, the similarity comprising at least one of a content similarity or a content provider similarity;

identify a subset of digital components from the plurality of candidate digital components, wherein the subset of digital components includes one or more digital components having the similarity below a threshold similarity;

provide the subset of digital components as input to a machine learning model;

determine, by executing the machine learning model, that digital components of the subset of components violate a policy;

generate as output, by executing the machine learning model, based on the determined policy violation, one or more labels for the subset of digital components; and propagate, after the one or more labels are output for the subset of digital components by the machine learning model, the one or more labels to other digital components, wherein the other digital components are outside of the subset of digital components.

14. The system of claim 13, wherein the one or more processors are further configured to remove, from the plurality of candidate digital components, a second subset of digital components, wherein the second subset of digital components includes one or more digital components having the similarity above the threshold similarity.

15. The system of claim 14, wherein the one or more processors are further configured to:

identify the previously reviewed digital component having a greater similarity to the second subject of digital components; and label the second subset of digital components with a policy violation label of the previously reviewed digital component having the greater similarity.

16. The system of claim 13, wherein:

the previously reviewed digital components comprises at least one of a previously reviewed labeled digital component or a previously reviewed unlabeled digital component; and when identifying the one or more digital components, the one or more processors are further configured to remove, from the plurality of candidate digital components, the previously reviewed labeled digital component.

17. The system of claim 13, wherein the one or more processors are further configured to:

determine whether the machine learning model has determined a policy violation for a candidate digital component; and deduplicate the plurality of candidate digital components to remove the candidate digital component having a previously determined policy violation.

18. The system of claim 13, wherein when determining that the one or more digital components violates the policy, the one or more processors are further configured to determine, by executing the machine learning model, a binary response to at least one prompt.

19. The system of claim 18, wherein the binary response is a yes or a no.

20. One or more non-transitory computer-readable medium storing instructions, which when executed by one or more processors, cause the one or more processors to:

determine embeddings associated with a plurality of candidate digital components and previously reviewed digital components;

determine, based on the determined embeddings, a similarity between the candidate digital components and previously reviewed digital components, the similarity comprising at least one of a content similarity or a content provider similarity;

identify a subset of digital components from the plurality of candidate digital components, wherein the subset of digital components includes one or more digital components having the similarity below a threshold similarity;

provide the subset of digital components as input to a large language model ("LLM");

determine, by executing the LLM, that digital components of the subset of components violate a policy;

generate as output, by executing the LLM, based on the determined policy violation, one or more labels for the subset of digital components; and propagate, after the one or more labels are output for the subset of digital components by the LLM, the one or more labels to other digital components, wherein the other digital components are outside of the subset of digital components.

* * * * *